(12) United States Patent
Cao

(10) Patent No.: US 12,199,259 B1
(45) Date of Patent: Jan. 14, 2025

(54) HOUSING AS ADDED OUTER LAYERS WITH MEDIUM CIRCULATION

(71) Applicant: Nier Engineering, LLC, Wilmington, MA (US)

(72) Inventor: Lei Cao, Wilmington, MA (US)

(*) Notice: Subject to any disclaimer, the term of this patent is extended or adjusted under 35 U.S.C. 154(b) by 253 days.

(21) Appl. No.: 17/861,944

(22) Filed: Jul. 11, 2022

Related U.S. Application Data

(60) Provisional application No. 63/340,307, filed on May 10, 2022, provisional application No. 63/331,261, filed on Apr. 15, 2022, provisional application No. 63/221,530, filed on Jul. 14, 2021.

(51) Int. Cl.
| | |
|---|---|
| *H01M 10/6563* | (2014.01) |
| *H01M 10/48* | (2006.01) |
| *H01M 10/653* | (2014.01) |
| *H01M 10/6556* | (2014.01) |
| *H01M 10/658* | (2014.01) |
| *H01M 50/258* | (2021.01) |
| *H01M 50/342* | (2021.01) |
| *H01M 50/375* | (2021.01) |
| *H01M 50/383* | (2021.01) |

(52) U.S. Cl.
CPC ..... *H01M 10/6563* (2015.04); *H01M 10/482* (2013.01); *H01M 10/653* (2015.04); *H01M 10/6556* (2015.04); *H01M 10/658* (2015.04); *H01M 50/258* (2021.01); *H01M 50/3425* (2021.01); *H01M 50/375* (2021.01); *H01M 50/383* (2021.01)

(58) Field of Classification Search
CPC .......... H01M 10/6563; H01M 10/653; H01M 10/6556; H01M 10/658; F28F 1/003
See application file for complete search history.

(56) References Cited

U.S. PATENT DOCUMENTS 4,228,848 A * 10/1980 Wadkinson, Jr. ....... F28D 7/106
  165/70
4,232,735 A * 11/1980 Kim ........................ F28F 1/003
  165/184

(Continued)

FOREIGN PATENT DOCUMENTS

CN           2578770        10/2003
CN          201772558 U      3/2011

(Continued)

*Primary Examiner* — Jon T. Schermerhorn, Jr.
(74) *Attorney, Agent, or Firm* — Lambert Shortell & Connaughton; David J. Connaughton, Jr.; Justin P. Tinger

(57) ABSTRACT

An enclosure system, device and methodology includes one or a plurality of containers, jointed by construction means for hermetically or not hermetically jointing single or plural numbers of said container, to form at least an enclosure with at least a layer of space on one face between applied numbers of said container, with or without a part or a layer that is expendable to increase the contained space inside the enclosure when filled. Said enclosure system, device and methodology is equipped with one or a plurality of medium-circulation-generation means for circulating a medium inside any of applied said container and/or any said space, with the emphasis of medium-circulation-facilitation means for strategically facilitating medium circulations inside any of applied said container and/or any said space.

29 Claims, 7 Drawing Sheets

(56) References Cited

U.S. PATENT DOCUMENTS

| | | | | |
|---|---|---|---|---|
| 4,422,273 | A | * | 12/1983 | Dyar .................. E04B 1/76 52/788.1 |
| 4,662,288 | A | | 5/1987 | Hastings |
| 5,101,710 | A | | 4/1992 | Baucom |
| 5,449,571 | A | | 9/1995 | Longardner |
| 5,710,543 | A | | 1/1998 | Moore |
| 6,158,833 | A | * | 12/2000 | Engler ............. H05K 5/0209 312/409 |
| 6,187,474 | B1 | | 2/2001 | Chalasani |
| 6,920,917 | B2 | * | 7/2005 | Inoue .................. F28F 1/06 165/154 |
| 7,335,243 | B2 | | 2/2008 | Homan |
| 7,545,639 | B2 | | 6/2009 | Ridge |
| 7,819,934 | B2 | | 10/2010 | Galliher |
| 7,913,511 | B2 | | 3/2011 | Meyer |
| 8,636,565 | B2 | | 1/2014 | Carlson |
| 9,321,340 | B2 | | 4/2016 | Maskew |
| 9,339,671 | B1 | | 5/2016 | Raj |
| 9,474,920 | B1 | | 10/2016 | Fewel |
| 9,478,834 | B2 | | 10/2016 | Sweetland |
| 9,490,507 | B2 | * | 11/2016 | Bandhauer ............. G08C 17/02 |
| 9,650,195 | B2 | | 5/2017 | Abdi |
| 9,704,384 | B2 | | 7/2017 | Bandhauer |
| 9,774,065 | B2 | | 9/2017 | Deng |
| 10,745,185 | B2 | | 8/2020 | Gehlhausen |
| 10,808,599 | B2 | | 10/2020 | Ogura |
| 10,903,536 | B2 | | 1/2021 | Jarahnejad |
| 11,211,093 | B2 | | 12/2021 | Gavillan |
| 11,261,309 | B2 | | 3/2022 | O'Neil |
| 11,318,849 | B2 | | 5/2022 | Soliman |
| 11,879,692 | B2 | * | 1/2024 | Colson ............. G01M 3/3236 |
| 2011/0056164 | A1 | | 3/2011 | Campisi |
| 2013/0146603 | A1 | | 6/2013 | Brilmyer |
| 2015/0047807 | A1 | | 2/2015 | Fiedrich |
| 2017/0256831 | A1 | | 9/2017 | Hong |
| 2019/0112809 | A1 | | 4/2019 | Frantz |
| 2019/0277184 | A1 | | 9/2019 | Ogura |
| 2019/0319320 | A1 | | 10/2019 | Jarahnejad |
| 2020/0220240 | A1 | | 7/2020 | Cheng |
| 2020/0251703 | A1 | * | 8/2020 | Aldrich ............. H01M 50/375 |
| 2021/0379428 | A1 | | 12/2021 | Tsutsui |
| 2022/0006144 | A1 | | 1/2022 | Rehfuss |
| 2022/0367944 | A1 | | 11/2022 | Park |

FOREIGN PATENT DOCUMENTS

| | | |
|---|---|---|
| CN | 102666157 A | 9/2012 |
| CN | 202585678 U | 12/2012 |
| CN | 103493243 A | 1/2014 |
| CN | 103493243 B | 1/2014 |
| CN | 103730705 A | 4/2014 |
| CN | 103847505 A | 6/2014 |
| CN | 103847505 B | 6/2014 |
| CN | 103904264 A | 7/2014 |
| CN | 103904264 B | 7/2014 |
| CN | 203826453 U | 9/2014 |
| CN | 105070974 A | 11/2015 |
| CN | 105180463 A | 12/2015 |
| CN | 204885359 U | 12/2015 |
| CN | 105356002 A | 2/2016 |
| CN | 205039220 U | 2/2016 |
| CN | 205104587 U | 3/2016 |
| CN | 105633484 A | 6/2016 |
| CN | 205542977 U | 8/2016 |
| CN | 106058386 A | 10/2016 |
| CN | 106058386 B | 10/2016 |
| CN | 106351339 A | 1/2017 |
| CN | 205911396 U | 1/2017 |
| CN | 205960072 U | 2/2017 |
| CN | 206076455 U | 4/2017 |
| CN | 206086422 U | 4/2017 |
| CN | 106711358 A | 5/2017 |
| CN | 106784441 A | 5/2017 |
| CN | 106785199 A | 5/2017 |
| CN | 106785199 B | 5/2017 |
| CN | 206148573 U | 5/2017 |
| CN | 206271838 | 6/2017 |
| CN | 106935931 A | 7/2017 |
| CN | 206301916 | 7/2017 |
| CN | 206353594 | 7/2017 |
| CN | 206388743 | 8/2017 |
| CN | 206422187 | 8/2017 |
| CN | 206441785 | 8/2017 |
| CN | 206524394 | 9/2017 |
| CN | 206585026 | 10/2017 |
| CN | 206685514 | 11/2017 |
| CN | 107437644 A | 12/2017 |
| CN | 206834286 | 1/2018 |
| CN | 207009520 | 2/2018 |
| CN | 107768738 A | 3/2018 |
| CN | 107799679 A | 3/2018 |
| CN | 207265193 | 4/2018 |
| CN | 107994290 A | 5/2018 |
| CN | 207353325 | 5/2018 |
| CN | 108199114 A | 6/2018 |
| CN | 108199114 B | 6/2018 |
| CN | 207459028 | 6/2018 |
| CN | 207474632 | 6/2018 |
| CN | 108312866 A | 7/2018 |
| CN | 108417926 A | 8/2018 |
| CN | 108417926 B | 8/2018 |
| CN | 207781673 | 8/2018 |
| CN | 108550948 A | 9/2018 |
| CN | 108550948 B | 9/2018 |
| CN | 108767371 A | 11/2018 |
| CN | 208173643 | 11/2018 |
| CN | 109037833 A | 12/2018 |
| CN | 109037833 B | 12/2018 |
| CN | 208256855 | 12/2018 |
| CN | 208272068 | 12/2018 |
| CN | 109233749 A | 1/2019 |
| CN | 109346784 A | 2/2019 |
| CN | 109346784 B | 2/2019 |
| CN | 208460930 | 2/2019 |
| CN | 208501967 | 2/2019 |
| CN | 208507893 | 2/2019 |
| CN | 109524743 A | 3/2019 |
| CN | 109640412 A | 4/2019 |
| CN | 208781979 | 4/2019 |
| CN | 109830624 A | 5/2019 |
| CN | 208873851 | 5/2019 |
| CN | 109950434 A | 6/2019 |
| CN | 208931077 | 6/2019 |
| CN | 209016227 | 6/2019 |
| CN | 110010808 A | 7/2019 |
| CN | 110061162 A | 7/2019 |
| CN | 209169327 | 7/2019 |
| CN | 110120477 A | 8/2019 |
| CN | 110157048 A | 8/2019 |
| CN | 110190296 A | 8/2019 |
| CN | 110190296 B | 8/2019 |
| CN | 209232856 | 8/2019 |
| CN | 209344178 | 9/2019 |
| CN | 209445648 | 9/2019 |
| CN | 110303731 A | 10/2019 |
| CN | 110303731 B | 10/2019 |
| CN | 110364782 A | 10/2019 |
| CN | 209461539 | 10/2019 |
| CN | 209675450 | 11/2019 |
| CN | 209730006 | 12/2019 |
| CN | 209766599 | 12/2019 |
| CN | 209843893 | 12/2019 |
| CN | 209843894 | 12/2019 |
| CN | 210086543 | 2/2020 |
| CN | 111009704 A | 4/2020 |
| CN | 111048708 A | 4/2020 |
| CN | 210331433 | 4/2020 |
| CN | 210576052 | 5/2020 |
| CN | 111326825 A | 6/2020 |
| CN | 111326825 B | 6/2020 |
| CN | 210723283 | 6/2020 |
| CN | 111370807 A | 7/2020 |
| CN | 111384465 A | 7/2020 |

(56) References Cited

FOREIGN PATENT DOCUMENTS

| | | |
|---|---|---|
| CN | 111384465 B | 7/2020 |
| CN | 210926210 | 7/2020 |
| CN | 211032147 | 7/2020 |
| CN | 211032243 | 7/2020 |
| CN | 211062833 | 7/2020 |
| CN | 111519837 A | 8/2020 |
| CN | 111519837 B | 8/2020 |
| CN | 211376845 | 8/2020 |
| CN | 211956218 | 11/2020 |
| CN | 212001776 | 11/2020 |
| CN | 112151913 A | 12/2020 |
| CN | 112151913 B | 12/2020 |
| CN | 212136642 | 12/2020 |
| CN | 112186291 A | 1/2021 |
| CN | 212303822 | 1/2021 |
| CN | 112490537 A | 3/2021 |
| CN | 112554374 A | 3/2021 |
| CN | 112554374 B | 3/2021 |
| CN | 112563636 A | 3/2021 |
| CN | 212783592 | 3/2021 |
| CN | 212848573 | 3/2021 |
| CN | 212905329 | 4/2021 |
| CN | 212991156 | 4/2021 |
| CN | 213242662 | 5/2021 |
| CN | 112952250 A | 6/2021 |
| CN | 112952250 B | 6/2021 |
| CN | 112993367 A | 6/2021 |
| CN | 213322740 | 6/2021 |
| CN | 113193261 A | 7/2021 |
| CN | 213636100 | 7/2021 |
| CN | 213636151 | 7/2021 |
| CN | 213782096 | 7/2021 |
| CN | 213816254 | 7/2021 |
| CN | 213878198 | 8/2021 |
| CN | 213936349 | 8/2021 |
| CN | 113381108 A | 9/2021 |
| CN | 113410539 A | 9/2021 |
| CN | 113410539 B | 9/2021 |
| CN | 113437402 A | 9/2021 |
| CN | 113555617 A | 10/2021 |
| CN | 113555617 B | 10/2021 |
| CN | 214477689 | 10/2021 |
| CN | 113675502 A | 11/2021 |
| CN | 214898581 | 11/2021 |
| CN | 214898582 | 11/2021 |
| CN | 113782869 A | 12/2021 |
| CN | 215070281 | 12/2021 |
| CN | 113991227 A | 1/2022 |
| CN | 215552419 | 1/2022 |
| CN | 114156566 A | 3/2022 |
| CN | 114221085 A | 3/2022 |
| CN | 215933678 | 3/2022 |
| CN | 216288616 | 4/2022 |
| CN | 216331317 | 4/2022 |
| CN | 216389569 | 4/2022 |
| CN | 114497802 A | 5/2022 |
| CN | 114530643 A | 5/2022 |
| CN | 114552066 A | 5/2022 |
| CN | 216435989 | 5/2022 |
| CN | 216750067 | 6/2022 |
| CN | 114695996 A | 7/2022 |
| CN | 114843657 A | 8/2022 |
| CN | 114914578 A | 8/2022 |
| CN | 114976372 A | 8/2022 |
| CN | 217114674 | 8/2022 |
| CN | 217361677 | 9/2022 |
| DE | 2657183 A1 | 6/1978 |
| DE | 10317251 A1 | 3/2004 |
| DE | 10320240 A1 | 12/2004 |
| DE | 102012021095 A1 | 5/2013 |
| DE | 102012214262 | 2/2014 |
| DE | 102013216296 A1 | 2/2015 |
| EP | 0243827 A1 | 11/1987 |
| EP | 0243827 B1 | 7/1991 |
| EP | 3496180 A1 | 6/2019 |
| FR | 2295361 A1 | 7/1976 |
| FR | 2295361 B1 | 11/1977 |
| FR | 2498521 A1 | 7/1982 |
| FR | 2524039 A1 | 9/1983 |
| FR | 2498521 B1 | 6/1985 |
| GB | 2125156 | 2/1984 |
| GB | 2464271 A | 4/2010 |
| GB | 2487910 A | 8/2012 |
| GB | 2464271 B | 4/2014 |
| GB | 2507266 A | 4/2014 |
| GB | 2487910 B | 5/2017 |
| JP | S57187860 A | 11/1982 |
| JP | S586354 A | 1/1983 |
| JP | H0227780 A | 1/1990 |
| JP | H04289675 A | 10/1992 |
| JP | 2000073463 A | 3/2000 |
| JP | 2000251953 A | 9/2000 |
| JP | 2000356364 A | 12/2000 |
| JP | 2002352866 A | 12/2002 |
| JP | 2002352867 A | 12/2002 |
| JP | 2005100694 A | 4/2005 |
| JP | 2006064296 A | 3/2006 |
| JP | 2008309398 A | 12/2008 |
| JP | 4242501 B2 | 3/2009 |
| JP | 2009252646 A | 10/2009 |
| JP | 2012033299 A | 2/2012 |
| JP | 2013048083 A | 3/2013 |
| JP | 5182444 B2 | 4/2013 |
| JP | 2013062207 A | 4/2013 |
| JP | 2013114926 A | 6/2013 |
| JP | 2013122844 A | 6/2013 |
| JP | 2013137152 A | 7/2013 |
| JP | 2013175296 A | 9/2013 |
| JP | 2013239477 A | 11/2013 |
| JP | 2014235897 A | 12/2014 |
| JP | 2015035335 A | 2/2015 |
| JP | 5772428 B2 | 9/2015 |
| JP | 2015232955 A | 12/2015 |
| JP | 2016018620 A | 2/2016 |
| JP | 2017004677 A | 1/2017 |
| JP | 2017027720 A | 2/2017 |
| JP | 2017198436 A | 11/2017 |
| JP | 2018005983 A | 1/2018 |
| JP | 6340960 B2 | 6/2018 |
| JP | 2019043178 A | 3/2019 |
| JP | 2019047555 A | 3/2019 |
| JP | 6654974 B2 | 2/2020 |
| JP | 2020059375 A | 4/2020 |
| JP | 2020157975 A | 10/2020 |
| JP | 2020202078 A | 12/2020 |
| JP | 2021164332 A | 10/2021 |
| JP | 2021190214 A | 12/2021 |
| KR | 20100007240 A | 1/2010 |
| KR | 100999955 B1 | 12/2010 |
| KR | 20120015900 A | 2/2012 |
| KR | 20120062318 A | 6/2012 |
| KR | 101284739 B1 | 7/2013 |
| KR | 20130073106 A | 7/2013 |
| KR | 101367212 B1 | 3/2014 |
| KR | 20140128101 A | 11/2014 |
| KR | 101582939 B1 | 1/2016 |
| KR | 101583679 B1 | 1/2016 |
| KR | 20180106625 A | 10/2018 |
| KR | 20200040127 A | 4/2020 |
| KR | 20200086494 A | 7/2020 |
| KR | 20210089307 A | 7/2021 |
| KR | 102294189 B1 | 8/2021 |
| KR | 20210109406 A | 9/2021 |
| KR | 102357178 B1 | 1/2022 |
| NL | 1035390 C2 | 10/2009 |
| RU | 2379794 C1 | 1/2010 |
| TW | 201303119 A | 1/2013 |
| TW | I461592 B | 11/2014 |
| TW | 201634798 A | 10/2016 |
| WO | 2013115251 A1 | 8/2013 |
| WO | 2013137185 A1 | 9/2013 |
| WO | 2014049344 A2 | 4/2014 |
| WO | 2014049344 A3 | 7/2014 |
| WO | 2015077293 A1 | 5/2015 |

(56) References Cited

FOREIGN PATENT DOCUMENTS

| | | |
|---|---|---|
| WO | 2015083569 A1 | 6/2015 |
| WO | 2016032101 A1 | 3/2016 |
| WO | 2020088106 A1 | 5/2020 |
| WO | 2022169169 A1 | 8/2022 |
| WO | 2022185561 A1 | 9/2022 |

* cited by examiner

HOUSING AS ADDED OUTER LAYERS WITH MEDIUM CIRCULATION

RELATED APPLICATIONS

This application claims benefits of U.S. Provisional Patent Application No. 63/221,530, filed Jul. 14, 2021, U.S. Provisional Patent Application No. 63/331,261, filed Apr. 15, 2022, and U.S. Provisional Patent Application No. 63/340,307, filed May 10, 2022.

FIELD OF INVENTION

The present invention relates to a system, device, and methodology providing housing with medium circulation to achieve functions such as housing, insulation, thermal regulations, climate control, and hazard containment, to the objects such as batteries.

BACKGROUND

Better containments are important for the applications involving batteries, computers, data storage and electric apparatus etc. that have requirements of housing, hazard prevention, hazard containments and thermal regulations.

For example, batteries have been reported to have concerns of "thermal runaway". "Thermal runaway" are the events that batteries caught on fire and built-up intense heat to ignite the adjacent batteries. The chain reactions of thermal runaway can lead to fire hazard in releasing the sum of the stored energy. Depending on the types and mechanisms of batteries, some active elements, such as lithium may be present and produced in the charging and recharging processes. Since some elements that are present in batteries such as lithium can be activated and cause fire hazards without the presence of oxygen, special fire-suppressing methods, and hazard containments, together with climate control need to be in place to house batteries. As widespread adaptations in using batteries as operation power as well as energy storage are taking place, demands for safer batteries have increased. Besides the improvements in developing different chemistry for batteries, battery safety also benefits from the improvements in providing better containments and thermal regulations. Improved housing containments and thermal regulations also benefit housing other objects such as electronics, computers, and electric apparatus.

There have been reported improvements emphasizing insulation with containments.

U.S. Pat. No. 6,158,833 describes a thermally insulated cabinet for protecting electronic data storage devices. The data storage device is affixed to the inner envelope to permit heated air to rise from the lower end of the inner envelope away from the location of the device. A tortuous path exists through thermal insulation to accommodate various electrical power, data and control cables that must be connected to the device to permit to the data storage device to function.

U.S. Pat. No. 7,545,639 describes a fireproof container with heat activated closure panel which allows to automatically close over vent holes within the container to restrict airflow therewithin, when the surrounding environment exceeds the threshold temperature.

U.S. Patent Application 2013/0146603 describes a fire containment case for selectively receiving and securing a portable electronic device and their batteries in the event of fire.

There have been reported improvements incorporating bags/pouches to contain effluent contents into containments.

U.S. Pat. No. 9,339,671 describes a portable flight case with a dual shell, linings, valves, indicators, agency/industry-approved fire extinguishers for personal electronic devices containing lithium-ion batteries. The fire extinguisher such that the infused extinguishing medium through the ports in the case while simultaneously allowing the egress of the initial smoke into containing flexible bags and equalizing the displaced volume being replaced by the extinguishing medium thus to suppress the fire.

U.S. Patent Application 2020/0251703 describes a containment system for battery packs containing an effluent containment pouch which expands to capture expelled effluent when the electrochemical cell experiences a thermal runaway condition.

U.S. Pat. No. 10,745,185 describes a shipping container configured for shipping lithium-ion batteries, having an outer box containing a vacuum plenum/thermal shield assembly that contains an inner container on a thermal shield inside a vacuum bag that further contains an inner cavity and an opening and a second flame-retardant pouch. The assembly rests on the tray, where the tray forms at least one flame-retardant pocket.

There have been reported improvements incorporating thermal regulations into containments.

U.K. Patent Application 2,125,156 discloses the use of phase change materials ("PCMs") in sealed bags in the battery electrolyte or even contained in the separator plates to place the PCM in intimate thermal contact with the electrolyte. When the liquid PCM discharges heat to the surrounding electrolyte over a short period of time, the temperature of the electrolyte rises to a desired level. The PCM gradually undergoes phase change to the solid state and must be reheated to be used again.

There have been reported improvements incorporating climate control of the surroundings into containments.

U.S. Pat. No. 11,211,093 describes an acclimation enclosure for a data storage library which provides at least one enclosure to surround at least one library access opening and to form a chamber and providing environmental conditioning.

U.S. Pat. No. 7,335,243 describes a biological containment apparatus comprising an outer chamber and an inner containment chamber, fully contained inside said outer chamber, and equipped with a first air filtration system and a second air filtration system. The system also comprises an air pressurization system, wherein said air pressurization system provides negative pressurization in said outer chamber and said inner chamber.

U.S. Pat. No. 7,819,934 describes environmental containment systems to perform all or part of biological, chemical, and/or pharmaceutical manufacturing processes therein. The environmental containment system includes a multi-level containment apparatus. For instance, a first substantially closed environmental containment enclosure may be contained within a second substantially closed environmental containment enclosure; the first and second enclosures may be contained in a third substantially closed environmental containment enclosure, etc. Between the enclosures are the enclosed spaces an aseptic and/or substantially particle-free environment within the enclosed space are maintained.

U.S. Pat. No. 7,913,511 describes a cargo container with thermal regulations.

U.S. Pat. No. 9,321,340 describes an energy storage system with thermal regulations. An enclosing plate is mounted exterior to the heat sink and defining an airflow cavity, wherein the enclosing plate further directs air from the fan across the heat sink.

U.S. Pat. No. 9,774,065 describes a liquid-cooled apparatus using soft-package lithium-ion batteries. Sets of lithium-ion batteries are immersed in the cooling liquid and have cooling liquid circulating through the grooves on the heat-transfer structure between the battery cells.

There have been reported improvements incorporating fire-extinguishing methods for housing batteries.

U.S. Pat. No. 9,478,834 describes a battery system that has a non-conductive fire suppressant liquid in a fire suppressant bladder inside the battery system U.S. Pat. No. 11,318,849 describes a battery that has a battery wall that encloses a battery interior with an extinguishing agent reservoir situating in the battery interior.

U.S. Patent Application 2021/0379428 describes an enclosure for batteries containing pockets capable of encapsulating at least one fire extinguishing fluid. The enclosure also contains an expandable gas balloon reservoir as a toxic-gas-release management and containment system.

U.S. Pat. No. 9,490,507 describes a battery management system that is coupled to a fire extinguishing device so that a cooling medium is conducted to the battery cell through the connecting channels upon the detection of local overheating of a battery cell.

U.S. Pat. No. 9,704,384 describes a refrigerant-conducting cooling system for a battery. When a thermal runaway event occurs and sensed by either active or passive sensors, the high-pressure refrigerant is preferentially ejected through strategically placed passages within the pack to rapidly quench the battery. The cooling system has injectors for targeted injection of the refrigerant into the battery in the event of damage to a cell. The expanse of the pressurized refrigerant in multiple cooling plates results in localized cooling and thus, quenching of the thermal runaway of the battery cells.

DE 102012021095 discloses an extinguishing device for a battery. The extinguishing device has an external reservoir for accommodating the extinguishing agent, a sensor system for detecting cell damage, and a conduction system for conducting the extinguishing agent into the battery in response to the detection of a damaged battery cell by the sensor system.

DE 102012214262 describes an extinguishing concept for high-voltage batteries in hybrid and electric vehicles. The extinguishing system has an extinguishing agent reservoir with a predetermined breaking point that is situated within a battery housing.

DE 102013216296 A1 describes a battery system in which a chemical sensor is used instead of a temperature sensor to detect damage to a battery cell.

U.S. Patent Application 2022/0006144 describes a traction battery device including at least one extinguishing apparatus for automatically carrying out an extinguishing process in an extinguishing situation.

Each of the prior arts has its own merit in improving the concept of housing and containment. Because each has different applications of emphasis, the focuses of specifications are different. For example, some applications are designed as insulation for small and portable electronics with no thermal regulations in the immediate surroundings of the electronics or batteries, such as U.S. Pat. No. 9,339,671. Some applications have thermal regulations integrated with the interior of the batteries, such as U.S. Pat. No. 11,318,849 and U.K. Patent Application 2,125,156. Other applications have thermal regulations incorporated in the covers and containers of the batteries, such as U.S. Pat. Nos. 9,321,340 and 9,774,065. Similarly, thermal regulations and climate control are considered in the applications to data storage rooms to acclimate computers and electrical components, such as U.S. Pat. No. 11,211,093. Thermal regulations and climate control are also considered in the applications of environmental containment systems to perform biological, chemical, and/or pharmaceutical manufacturing processes, such as U.S. Pat. Nos. 7,335,243 and 7,819,934. Furthermore, fire extinguishing methods are incorporated in many applications, such as U.S. Pat. No. 11,318,849, DE 102012021095, and U.S. Patent Application 2022/0006144.

The following patents are cited herein as references: U.S. Pat. No. 9,474,920 describing a fire extinguisher system, U.S. Pat. No. 5,101,710 describing a control apparatus or system for purging and pressurizing electrical equipment with pressurizing or purging gas.

SUMMARY

Efficiently achieving uniformity of temperature conditioning to the immediate surroundings for the objects including but not limited to batteries improve the performance and safety. Some embodiments in this disclosure address the system and the device to provide improvements on uniformity of thermal-regulations with emphasized circulations of medium, especially the circulation of medium that is in the immediate surrounding of the objects which are often omitted by the prior arts. Embodiments of containment in three examples and in two scenarios are disclosed in this disclosure. In the scenario that there is communication between the thermally-conditioned medium and the surrounding medium of the objects inside said container, thermal regulations inside said container are provided through the circulating medium that is thermally conditioned. In the scenario that there is no communication between the thermally conditioned medium and the surrounding medium of the objects inside said container, such as in the conditions that i) the surroundings of the objects maintaining vacuumed or relatively vacuumed conditions, ii) the thermally-conditioned medium and the surrounding medium of the objects inside said container are different, iii) the surroundings of the objects maintaining pressurized conditions with a medium that is different from thermally-regulated medium by an air-conditioning unit, thermal regulations to the surroundings of the objects can be realized through the heat-conductive frame of said container that is cooled or heated by the adjacent thermally-conditioned medium. Some embodiments of example 1 in scenario 1 and some embodiments of example 2 in scenario 2 are disclosed for applications such as housing battery storage or housing data centers etc. Some embodiments of example 3 in scenario 2 are disclosed for applications to accommodate smaller objects taking advantages of using heating and/or cooling mediums, such as diathermic oil for thermal regulations, in which case otherwise air conditioning would become cumbersome due to small sizes of the containments.

BRIEF DESCRIPTION OF THE DRAWINGS

Advantages of the present invention will be apparent from the following detailed description of embodiments, which description should be considered in conjunction with the accompanying drawings, in which:

FIG. 1B is shown with the emphasis on showing the medium exchange between the interior of said system and said device, and the outside of "the outer layer" 2006.

DETAILED DESCRIPTION OF THE EMBODIMENTS

Some selected embodiments are shown in the figures. The parts labelled with the same nomenclatures in different embodiments may be modified according to the configurations and applications.

Some embodiments in this disclosure address the importance of circulations of mediums in thermal regulations, especially the circulation of the medium that is in the immediate surrounding of the objects, which are often omitted by the prior arts.

As shown in FIG. 1A, FIG. 1B, FIG. 3 and FIG. 4, in one embodiment, said space 10 is the space between "the outer layer" 2006 and the "medium-circulation guide" 2037 and "the second layer" 2007.

The space 8 is the portion of the space inside "the second layer" 2007 which is the immediate surrounding space to the objects. The space 9 is the portion of the space that is roughly separated by "the medium-circulation guide" 2037 from the space 8 inside "the second layer" 2007.

The vents 2005 include but are not limited to the vents 2005*c* on "the medium-circulation guide" 2037 that vent to the space 10 that is between "the second layer" 2007 and "the outer layer" 2006, and the vents 2005*b* through both "the medium-circulation guide" 2037 and "the outer layer" 2006 that vent to the outside of "the outer layer" 2006, and the vents 2005*a* that are on "the outer layer" 2006 and vent from the space 10 to the outside of "the outer layer" 2006.

Figure 3:
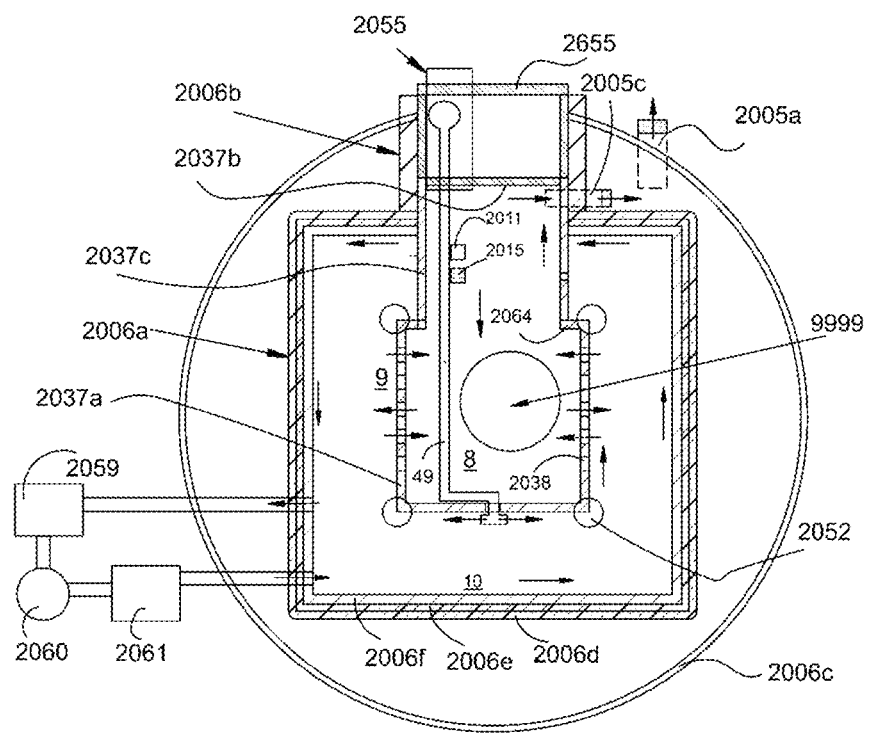
FIG. 3 is a front view of an embodiment of a container assembly in accordance with the invention.

Referring to FIG. 3, the panels of the medium-circulation guide 2037 that are erected before and with a spaced relation to the walls of "the second layer" 2007 inside "the second layer", have holes 2038 all over the panels 2037 to allow medium communication between said space 9 and said space 8. The medium-circulation guide 2037 is counted as a medium-circulation-facilitation means.

The medium-circulation-facilitation means for facilitating medium circulations include but are not limited to the following embodiments: i) strategically placed inlets and/or outlets of medium-circulation-generation means for facilitating mixing mediums; ii) strategically placed medium-circulation-generation means such as a fan for facilitating mixing mediums; iii) a panel of "the medium-circulation guide" 2037 for guiding the flow of the medium.

There are barometric sensors 2011 inside "the second layer" 2007 and barometric sensors 2011 inside the space 10 inside "the outer layer" 2006. The barometric sensors 2011 send pressure signals to the central controllers that regulates some or all of the components. There are thermal sensors 2015 inside "the second layer" 2007 and inside the space 10 inside "the outer layer" 2006. The thermal sensors 2015 send thermal signals to the central controllers. There may be oxygen sensors 2016 near the outlet inside "the second layer" 2007. The oxygen sensors 2016 send signals to the central controllers. There are smoke detectors 2021 inside "the second layer" 2007 and in the space 10 inside "the outer layer" 2006. The smoke detectors 2021 send signals to the central controllers.

Figure 1A:
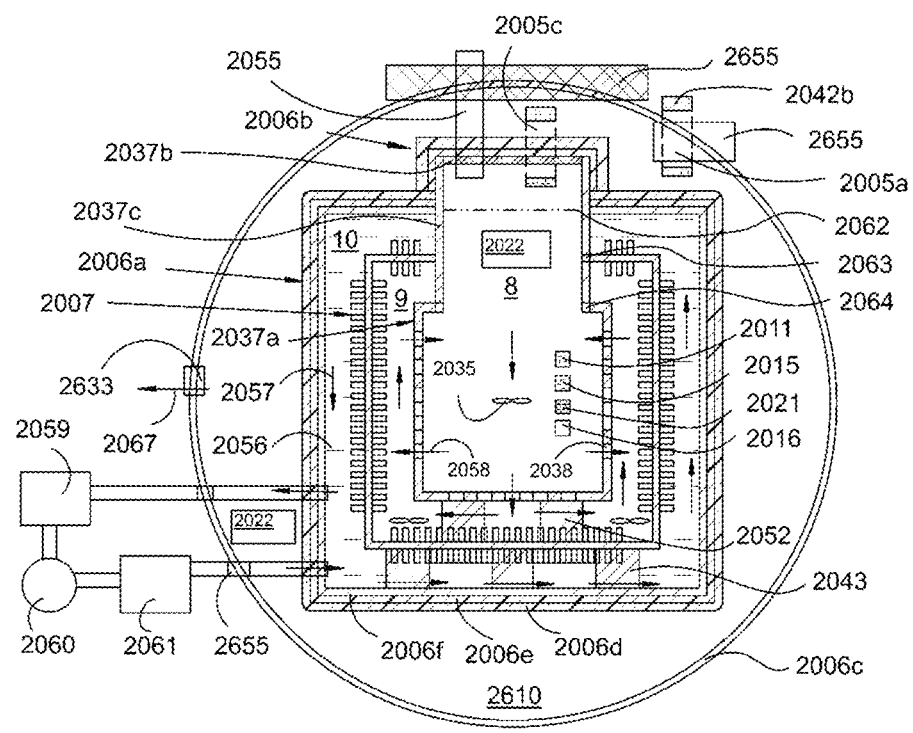
FIG. 1A is a front view of an embodiment of a container assembly in accordance with the invention, utilizing cooling and/or heating mediums such as diathermic oil in thermal regulations.

Depending on the types of the medium in applications, there are supplied-gas tanks such as nitrogen tanks. Said supplied-gas tanks are connected with the gas distribution systems such as the pipelines. In one embodiment, as shown in FIG. 1A, upon the commands from the central controller, said supplied gas is discharged from said supplied-gas tanks into inside "the second layer" 2007. In one embodiment, said vacuum system have functions to maintain the desired compositions of said medium inside the "the second layer" 2007. In one embodiment, said vacuum system maintain a hypoxic but breathable level of oxygen concentrations inside the "the second layer". In one embodiment, said vacuum system provides a pressurize environments for fire safety inside the "the second layer" 2007.

Example 1

Referring to FIG. 3, as example 1, in the scenario 1 that there is communication between the medium in said space 10 that is thermally conditioned by said air-conditioning unit and the medium in said space 8 and said space 9. The pipe of said air-conditioning unit directly introduces the thermally conditioned air into said space 9. Therefore, it is less critical for said "the second layer" 2007 to have heat conductivity, but beneficial to be fire-resistant. In such case, said "the second layer" 2007 also can be of materials such as fire-retardant plastics.

Figure 4:
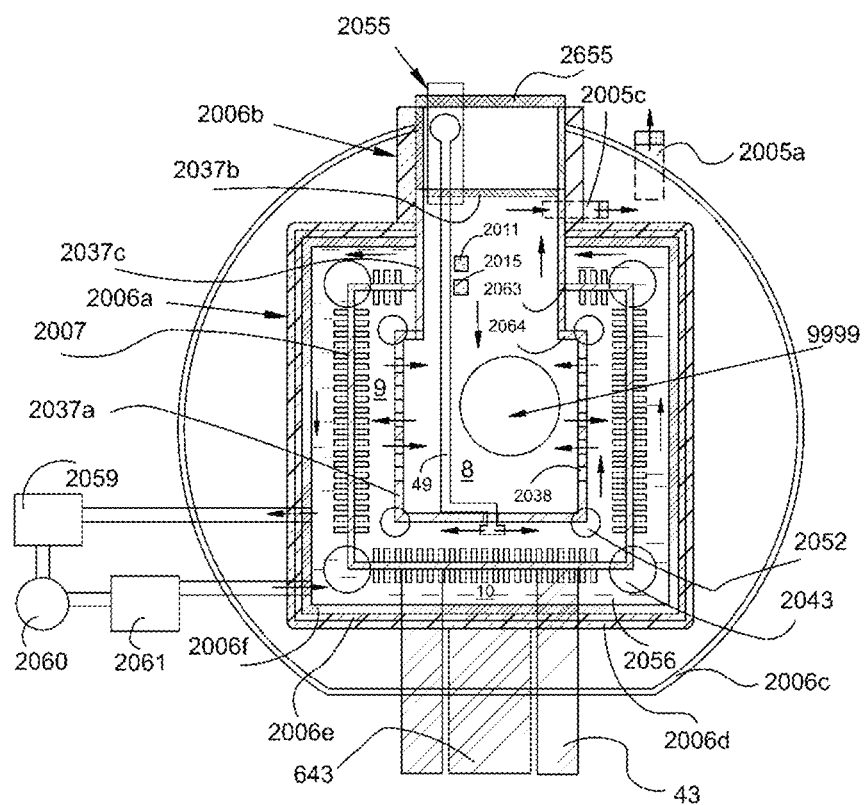
FIG. 4 is a front view of an embodiment of a container assembly in accordance with the invention. Medium circulations are shown in arrows.

The supplied-gas tanks with its distribution system which are shown in FIG. 3, and FIG. 4 may also be omitted in such case.

A distribution system of a supplied gas tank is added parallelly to the access 2055.

In one embodiment, the access 2655 on the layer 2006*c* of "the outer layer" 2006 of FIG. 1A is extended outward from "the medium-circulation guide" 2037.

Figure 1B:
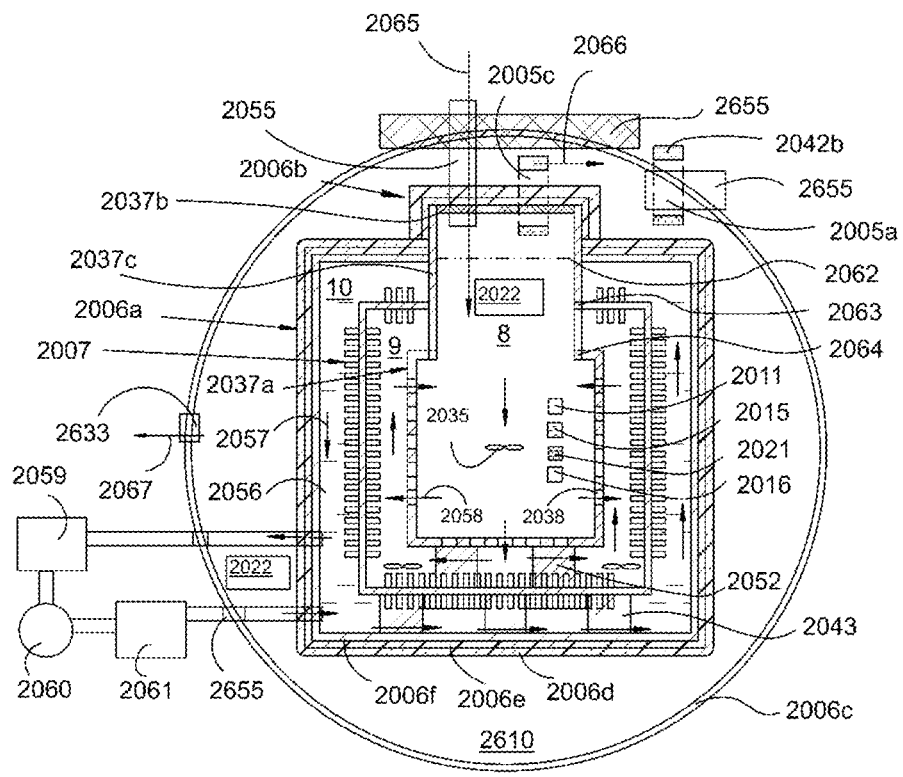
FIG. 1B is a front view of an embodiment of a container assembly in accordance with the invention, utilizing cooling and/or heating mediums such as diathermic oil in thermal regulations.
Figure 2A:
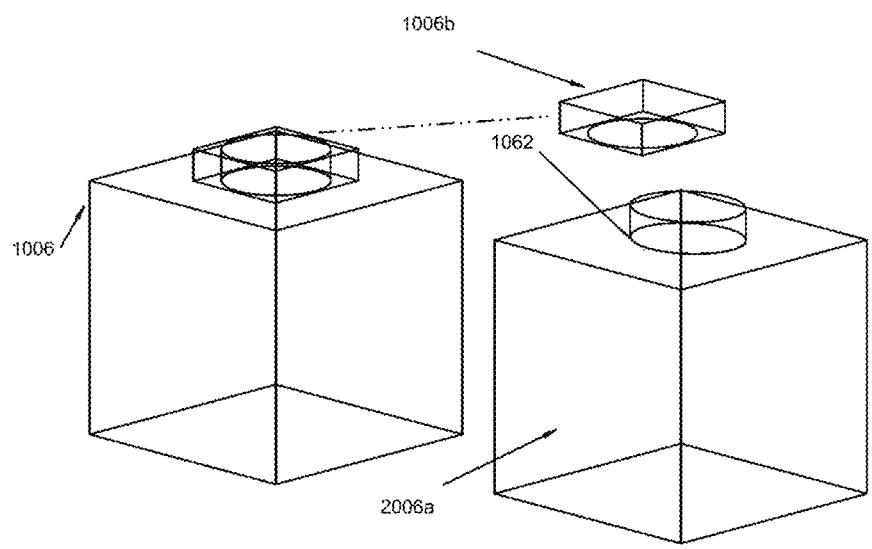
FIG. 2A is a perspective view of an embodiment of "the outer layer" 2006 from FIG. 1A and FIG. 1B, in accordance with the invention.
Figure 2B:
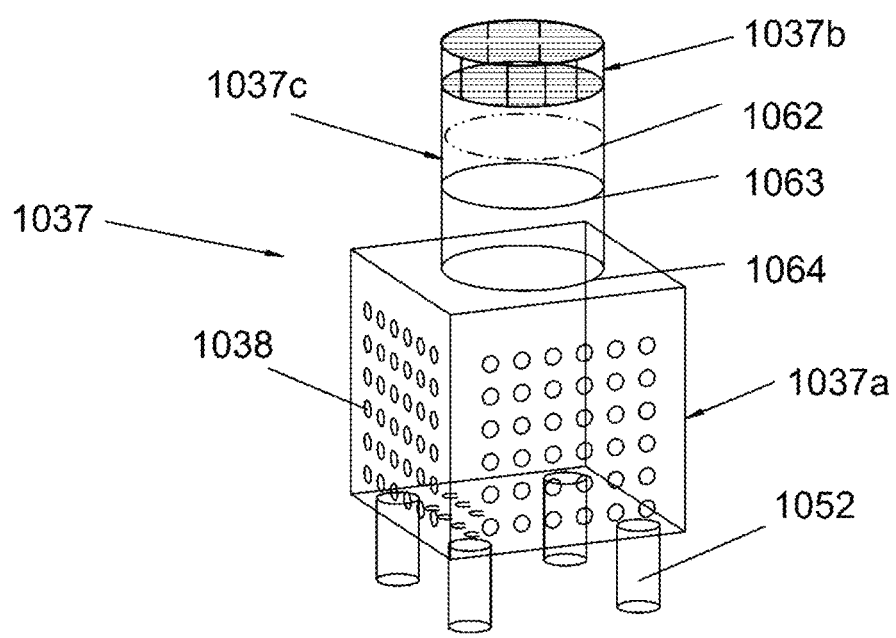
FIG. 2B is a perspective view of an embodiment of the "medium-circulation guide" 2037 from FIG. 1A and FIG. 1B, in accordance with the invention.
Figure 2C:
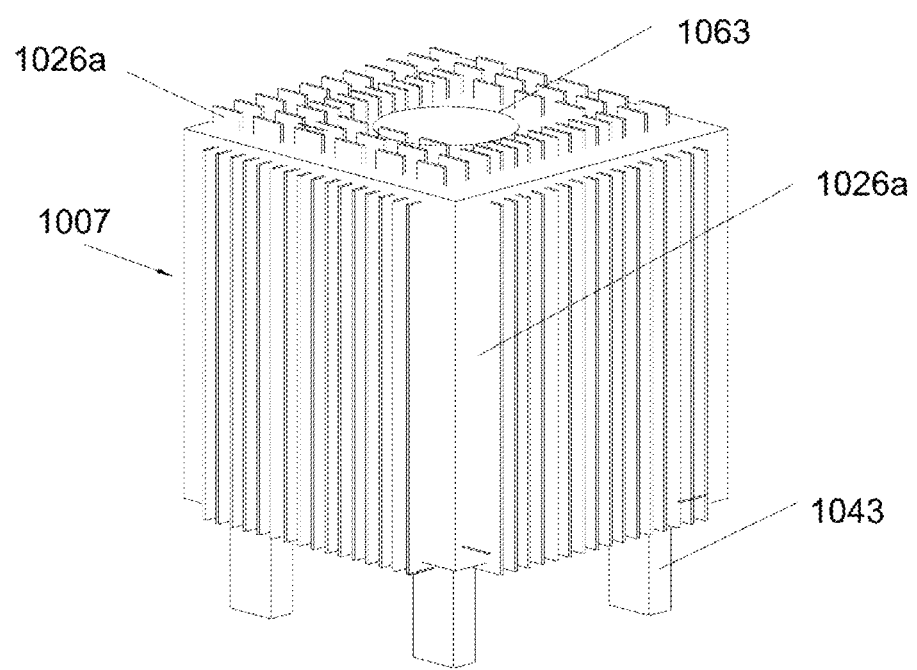
FIG. 2C is a perspective view of an embodiment of "the second layer" 2007 from FIG. 1A and FIG. 1B, in accordance with the invention.

In one embodiment, said system and said device can load from the top, by opening the access 2655 on the layer 2006*c* of "the outer layer" 2006 and the access 2055 to the space 8 through the layers. In one embodiment, both "the second layer" 2007 and the "medium-circulation guide" 2037 are made of metal of heat conductivity. The ridges 2026*a* on both sides of the surfaces of "the second layer" 2007 and the ridges 2026*b* on only one side of the surfaces of "the second layer" 2007 facilitates heat transfer. Referring to FIG. 1A, FIG. 1B, and FIG. 2B, "the medium-circulation guide" 2037 has supporting means such as the braces 2052. Said "the medium-circulation guide" 2037 also has a container-like portion 2037*a* with holes 2038 covering at least the side panels and the bottom panel, a neck portion 2037*c*, and a lid 2037*b*. Said neck portion 2037*c* and said container 2037*a* are hermetically joined together at the joint 2064. "The second layer" 2007 and the "medium-circulation guide" 2037 are hermetically joined at the joining sites 2063, so that the heating and/or cooling medium such as diathermic oil 2056 in the space 10 does not leak in the space 9 or the space 8, and the medium in the space 9 and in the space 8, such as nitrogen does not leak in the space 10. In one embodiment, said space 10 is the space between "the outer layer" 2006 and the "medium-circulation guide" 2037 and "the second layer" 2007. Said space 8 and said space 9 are filled with nitrogen or other medium that communicates through the holes 2038 on the "medium-circulation guide" 2037. As shown in FIG. 1A and FIG. 1B, said medium also circulates in the space 9 through the holes 2053 in the braces underneath the "medium-circulation guide" 2037, as well as around the portion of the neck of the "medium-circulation guide" 2037 inside the space 9. There are fans 2035 or other medium-circulation-generation means to move said medium inside the space 9.

In one embodiment, "the outer layer" 2006 consists of four layers, from inside toward outside, namely 2006f, 2006e, 2006d, and 2006c. In one embodiment, the layer 2006d is made of molded composite with or without fiber reinforced layers; the layer 2006e is made of the panels of thermal-insulation materials; and the layer 2006f is a layer sealing said layer 2006e from said heating and/or cooling medium, and that is selected to be inert with the heating and/or cooling medium such as diathermic oil. In one embodiment, the layer 2006c is a durable and flexible layer that can fold into smaller volume at normal conditions. In the events of leakage of said heating and/or cooling medium 2056, the layer 2006c provides a containment for leaked liquid or the medium. Said layer 2006c also provides hazard containments in the events that the contents in the space 8 vent out, such as in the events of thermal runaway of the batteries.

There are also the filters 2042b on medium-regulation means such as vents 2005a and 2005c. Referring to FIG. 1B, depending on the applications, a medium in the interior of said system and said device may need to be discharged by the vents 2005c that is through the lid 2006b of the outer layer 2006 and the lid 2037b of the medium-circulation guide 2037, into the enclosed space 2610 that is created by the expandable layer 2006c of "the outer layer" 2006, which may be further drained either continuously or periodically or by pressure indications through the access 2633 of medium-regulation means, such as vents. Supplied mediums are supplied from the outside of "the outer layer" 2006, through the access 2055 to said space 8 which is on the layers of "the outer layer" 2006, and the lid 2037b of the medium-circulation guide 2037, as well as the access 2655, into the interior of said system and said device. As shown in FIG. 1B, the arrows 2065, 2066 and 2067 are used to indicate the movements of the supplied medium and of the medium that is discharged out of said system and said device.

Example 2

In example 2, as shown in FIG. 4, in the scenario 2 that there is no communication between the medium in said space 10 that is thermally conditioned by said thermal-conditioning assembly (shown as an assembly of 2059, 2060, and 2062), and the medium in said space 8 and said space 9. Said space 8 and said space 9 inside said "the second layer" 2007 maintain vacuumed conditions or relatively vacuumed conditions or pressurized conditions that are filled with supplied gases inside said "the second layer" 2007. If a thermally-regulated medium from said thermal-conditioning assembly (shown as an assembly of 2059, 2060, and 2062) is the same type of medium as the medium inside said space 8 and said space 9, the example 1 of scenario 1 as shown in FIG. 3 may need to be considered. Otherwise, in the following conditions that i) said space 8 and said space 9 maintaining vacuumed or relatively vacuumed conditions, ii) the surrounding medium of the objects inside said space 8 and said space 9 is different from the thermally-regulated medium by said thermal-conditioning assembly (shown as an assembly of 2059, 2060, and 2062), iii) said space 8 and said space 9 maintaining pressurized conditions with the medium that is different from the thermally-regulated medium from said thermal-conditioning assembly (shown as an assembly of 2059, 2060, and 2062), the thermal regulations to the surroundings of the objects can be realized through the heat-conductive frame of said container that is cooled or heated by the adjacent thermally-conditioned medium. As shown in FIG. 4, the thermally-conditioned gas is introduced into said space 10 by thermal-conditioning assembly (shown as an assembly of 2059, 2060, and 2062). The medium in said space 8 and space 9 is contained in "the second layer" 2007. The medium exchange inside said space 8 and said space 9 more relies on the vacuum system comprising the vacuum pump, the inlet filtration system, the exhaust filtration system and the distribution pipes, as well as the supplied-gas tank and its distribution system 49. There are also considerations on strategically placing the inlets of the said vacuum system and the outlets of the distribution system 49 of the supplied gas tanks in the locations where the removal of the medium and the introduction of the supplied gas have minimal disturbance on the temperatures inside said space 8. For example, the distribution system 49 of the supplied gas can be strategically placed inside said space 9 so that the supplied gas moves up along the "medium-circulation guide" 2037c, upon being released, and is thermally conditioned by the thermal conductivity of the walls of "the second layer" 2007. This consideration counts as said medium-circulation-facilitation means.

Example 3

Some embodiments in this disclosure also address containers with thermal regulations utilizing liquid medium. As shown in FIG. 1A and FIG. 1B, in this example, some embodiments disclose that the immediate surrounding of the objects are surrounded in the circulations of supplied air or selected gas that is thermally conditioned by the adjacent enclosure of a liquid medium. Said embodiments also disclose hazard containments that are not only for containing a liquid medium that is used for thermal regulations in the events of leakage, but also for hazard containments in the events such as the thermal runaway of the batteries. Differing from some prior arts that offer cooling methods that are built within the batteries or inside the battery packs, such as U.S. Pat. No. 949,057 and U.K. Patent Application 2,125,156, some embodiments in this disclosure provide overall housing and containments. The embodiments in this disclosure are not limited to the applications on batteries. Some embodiments can also be applied to electronics, computers, electricals, and the objects that requires climate-controlled conditions.

As shown in FIG. 1A and FIG. 1B, some embodiments can accommodate smaller objects taking advantages of using heating and/or cooling oil for thermal regulations, in which case otherwise air conditioning would become cumbersome due to small sizes of the containments. In the example 3, as thermal regulation depends on the thermal conductivity of "the second layer" 2007, "the second layer" 2007 is made of materials of thermal conductivity such as metal. In one embodiment, said system and said device can load from the top, by opening the access 2655 on the layer 2006c of "the outer layer" 2006 and the access 2055 to the space 8 through the layers. In one embodiment, both "the second layer" 2007 and the "medium-circulation guide" 2037 are made of metal of heat conductivity. The ridges 2026*a* on both sides of the surfaces of "the second layer" 2007 and the ridges 2026*b* on only one side of the surfaces of "the second layer" 2007 facilitates heat transfer. Referring to FIG. 1A, FIG. 1B, and FIG. 2B, "the medium-circulation guide" 2037 has supporting means such as the braces 2052. Said "the medium-circulation guide" 2037 also has a container-like portion 2037*a* with holes 2038 covering at least the side panels and the bottom panel, a neck portion 2037*c*, and a lid 2037*b*. Said neck portion 2037*c* and said container 2037*a* are hermetically joined together at the joint 2064. "The second layer" 2007 and the "medium-circulation guide" 2037 are hermetically joined at the joining sites 2063, so that the heating and/or cooling medium such as diathermic oil 2056 in the space 10 does not leak in the space 9 or the space 8, and the medium in the space 9 and in the space 8, such as nitrogen does not leak in the space 10. In one embodiment, said space 10 is the space between "the outer layer" 2006 and the "medium-circulation guide" 2037 and "the second layer" 2007. Said space 8 and said space 9 are filled with nitrogen or other medium that communicates through the holes 2038 on the "medium-circulation guide" 2037. As shown in FIG. 1A and FIG. 1B, said medium also circulates in the space 9 through the holes 2053 in the braces underneath the "medium-circulation guide" 2037, as well as around the portion of the neck of the "medium-circulation guide" 2037 inside the space 9. There are fans 2035 or other medium-circulation-generation means to move said medium inside the space 9. Between the portion 2037*a* of said "medium-circulation guide" 2037 which is joined with "the second layer" 2007, and the portion 2006*a* of 'the outer layer" 2006, is the circulating heating and/cooling medium 2056 such as diathermic oil. The maximal filling line 2062 is marked on the neck portion of said "medium-circulation guide" 2037 to indicate that the maximal filling level of a heating and/cooling medium such as diathermic oil 2056 in space 10 which is outside of the neck portion of said "the medium-circulation guide" 2037, so that the space 8 is dry and oil free, but also accessible from the outside through said access 2037*b*, 2006*b* and 2655. In one embodiment, there are holes 2054 in the braces 2043 underneath "the second layer" 2007, which allow said heating and/cooling medium 2056 circulating through. FIG. 1A and FIG. 1B only show some embodiments of the holes 2053 and 2054. Said heating and/cooling medium such as diathermic oil 2056 is thermally conditioned and circulated by the system comprising, the reservoir 2059 of a cooling and/or heating medium such as diathermic oil, pumps 2060, heating and/or cooling system for heating and/or cooling medium such as radiator 2061. In one embodiment, "the outer layer" 2006 consists of four layers, from inside toward outside, namely 2006*f*, 2006*e*, 2006*d*, and 2006*c*. In one embodiment, the layer 2006*d* is made of molded composite with or without fiber reinforced layers; the layer 2006*e* is made of the panels of thermal-insulation materials; and the layer 2006*f* is a layer sealing said layer 2006*e* from said heating and/or cooling medium, and that is selected to be inert with the heating and/or cooling medium such as diathermic oil. In one embodiment, the layer 2006*c* is a durable and flexible layer that can fold into a smaller volume at normal conditions. In the events of leakage of said heating and/or cooling medium 2056, the layer 2006*c* provides a containment for leaked liquid or the medium. Said layer 2006*c* also provides hazard containments in the events that the contents in the space 8 vent out, such as in the events of thermal runaway of the batteries. There are also the filters 2042*b* on medium-regulation means such as vents 2005*a* and 2005*c*. Referring to FIG. 1B, depending on the applications, a medium in the interior of said system and said device may need to be discharged by the vents 2005*c* that is through the lid 2006*b* of the outer layer 2006 and the lid 2037*b* of the medium-circulation guide 2037, into the enclosed space 2610 that is created by the expandable layer 2006*c* of "the outer layer" 2006, which may be further drained either continuously or periodically or by pressure indications through the access 2633 of medium-regulation means, such as vents. Supplied mediums are supplied from the outside of "the outer layer" 2006, through the access 2055 to said space 8 which is on the layers of "the outer layer" 2006, and the lid 2037*b* of the medium-circulation guide 2037, as well as the access 2655, into the interior of said system and said device. As shown in FIG. 1B, the arrows 2065, 2066 and 2067 are used to indicate the movements of the supplied medium and of the medium that is discharged out of said system and said device.

Similarly, as described in FIG. 1A and FIG. 1B, in one embodiment, upon the detection of the signals from the smoke detectors 2021, and/or the signals from the barometric sensors 2011, and/or the signals from the thermal sensors 2015, and/or the signals from the oxygen sensors 2016, the central control coordinates some or all of the components including but not limited to said communication means such as the alarm system, said medium-circulation-generation means such as axial fans 2035, said thermal-regulation means such as the system for thermally conditioning and circulating a heating and cooling medium comprising the reservoir 2059 of a cooling and/or heating medium such as diathermic oil, pumps 2060, a heating and/or cooling system such as radiator 2061, said medium-circulation-facilitation means, and said medium-regulation means such as vents 2005*a* and 2005*c*, to further cool down said heating and/or cooling medium 2059 in said space 10 and said medium in said space 8 and 9. If such efforts fail and/or upon the detection of the signals such as the predetermined breaking point of temperatures, in one embodiment, fire-extinguishing mixtures in the fire extinguisher 2022 that meet the requirements of US EPA requirements regarding ozone depleting substance ozone safe alternatives, and that are stored in said system and said device, for example, such as in the space 8 as shown in FIG. 1A and FIG. 1B, are triggered either actively or passively. In one embodiment, upon detecting smoke or other unwanted gas in the surrounding environments of the object, and/or upon detection of the preset temperature threshold, the integrated system sounds alarm. In one embodiment, upon detecting the preset threshold of the pressures in said system and said device, the central control either passively or actively activates said medium-regulation means, such as vents 2005*a* and 2005*c*, to release the pressure build-ups in said system and said device. In one embodiment, as shown in FIG. 1A and FIG. 1B, the vents 2005*a* on 2006*c* release the contents inside the outer most layer 2006*c*, upon reaching the pressure thresholds, after the vents 2005*c* on said 2006*b* and 2037*b* reaching the thresholds to release the contents inside said 2037 and the contents inside 2006*c*.

Some embodiments in this disclosure also intend to cover at least a feature of one embodiment in separate configurations or in combinations, whether the feature of one embodiment is combined with any other embodiments that are presented in this disclosure or is not combined with any embodiment that is presented in this disclosure, with reasonable considerations.

Parts and Descriptions 4, the objects such as batteries; 8, the space that is the portion of the space where the objects are supposed to be accommodated inside "the second layer" 2007; 9, the space that is the portion of the space that is roughly separated by "the medium-circulation guide" 2037 from the space 8 inside "the second layer" 2007; 10, the space that is the space between "the second layer" 2007 and "the outer layer" 1006; 43, the supporting brace that is underneath "the second layer" 7; 49, the distribution pipes of the supplied gas; 2005a, the vents that vent from the space between 2006c and the rest of the layers of "the outer layer" 2006, to outside of said system and said device; 2005c, the vents that vent from the space 8 to the space between the layers of "the outer layer" 2006 and "the second layer" 2007; 2006, the outer layer; 2006a, a portion of 2006; 2006b, the rest portion of 2006, such as the lid portion of 2006; 2006c, 2006d, 2006e, 2006f, the layers of 6; 2007, the second layer; 2011, the barometric sensors; 2015, thermal sensors; 2016, oxygen sensors; 2021, smoke detectors; 2022, fire extinguisher; 2026a, the ridges on both sides of the surfaces of "the second layer" 2007; 2026b, the ridges on only one side of the surfaces of "the second layer" 2007; axial fans; 2037, medium-circulation guide; 2037a, the portion of medium-circulation guide 2037; 2037b, the rest of the medium-circulation guide 2037, such as the lid portion; 2038, holes on the panels of "the medium-circulation guide" 2037; 2042b, the filters on the vents or exhaust discharging ports down stream of said exhaust filtration; 2043, the supporting brace that is underneath "the second layer" 2007; 2052, the supporting brace that is underneath said "medium-circulation guide" 2037; 2053, the holes in the supporting brace 2052; 2054, the holes in the supporting brace 2043; 2055, the access to the space 8 through the layers; 2056, cooling and/or heating medium such as diathermic oil 2056; 2057, the movements of 2056; 2058, the movements of the medium in the space 8 and 9; 2059, the reservoir of cooling and/or heating medium such as diathermic oil; 2060, pumps; 2061, heating and/or cooling system for heating and/or cooling medium such as radiator; 2062, maximal filling line for diathermic oil in the space 10; 2063, the joint of 2037 and 2007; 2064, the joint of 2037c and 2037a; 2065, the movements of the air or supplied medium being supplied from the outside of "the outer layer" 2006; 2066, the movements of the air or medium being discharged into the space 2610, from the interior of said system and said device; 2067, the movements of the air or medium being discharged from the space 2610, into the outside of said system and said device; 2610, the enclosed space that is created by the expandable layer 2006c of "the outer layer" 2006; 2633, the access to the space 2610 through the expandable layer 2006c of "the outer layer" 2006; 2655, the access on the layer 2006c of "the outer layer" 2006.

Further Illustrations

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the embodiments described herein. Additional embodiments are also disclosed as follows.

In some embodiments, said devices, said system and said methodologies comprise the following components:

one or a plurality of a container, or housing, or can, or case, or cabinet, or room, or any geometric resemblance such as cube, dome, or sphere etc., or enclosure, having a plurality of faces, with or without accessibility to the interior, and with or without a part or a layer that is expendable to increase the contained space inside the enclosure when filled.

one or a plurality of supporting means such as braces to support said single or plural numbers of said container, and may or may not have an in-ground portion one or a plurality of medium-circulation-generation means that are powered means for creating medium circulations inside any of the single or plural numbers of said container or said layer of space, One or a plurality of medium-circulation guides such as the embodiments described as 2037 comprising one or a plurality of guided and/or detoured distribution paths of a medium in an immediate space with one or a plurality of objects within said container.

In one embodiment, an enclosure system is provided. In a further embodiment, the system disclosed above includes but is not limited to having at least one layer that has the function of being air-tight and/or water impermeable when in operation. In one embodiment, said system and said device is not air-tight or water impermeable. In one embodiment, said system and said device includes but is not limited to having at least one layer that is made of, or is coated with, fire resistance materials and/or water resistance materials. In one embodiment, said system and said device includes but is not limited to having at least one layer that is made of, or is coated with materials of thermal insulation.

In still further embodiments, the system according to the above has walls that are made of materials of thermal conductivity, such as materials including but not limited to aluminum, copper, and steel, with or without the treatments including but not limited to the metal being coated with inert materials for handling the circulating medium. In one embodiment, it includes but is not limited for said system and said device to be constructed with plural materials. In one embodiment, said walls of said system and said device are modified to boost its heat-conductivity and/or coldness-conductivity means for conducting heat and/or coldness from the adjacent compartments. Also, in one embodiment, some of said walls of said system and said device are modified to minimize its heat-conductivity and/or coldness-conductivity to prevent conducting heat and/or coldness from the adjacent compartments. In one embodiment, the locations of said walls of said system and said device which have thermal conductivity, include but are not limited to the depicted locations in this disclosure. In one embodiment, some of said walls of said system and said device are modified to have functions of thermal insulation to minimize thermal exchange from the outside environment.

In another embodiment, said system and said device includes but is not limited to having at least one layer that has frame means of providing the stable frame to withstand the vacuum conditions, or the pressurized conditions, or the normal atmosphere. In one embodiment, said system and said device has at least a part that is flexible. In one embodiment, said system and said device has various mechanical strength to endure the buildups of the pressures before the pressures reaching the thresholds of the vents on said system and said device.

Further, said system and said device may include but is not limited to having at least a part that can expand the capacity of the containment of said system and said device. In one embodiment, said system and said device has an expendable and flexible and durable portion, which is able to collapse to be folded when not in use but is able to create and withhold the space inside as the additional containments.

In another embodiment, the system according to the above, wherein construction means for joining single or plural numbers of said container to construct said system and said device, include but are not limited to the depicted in this disclosure. In one embodiment, any applied container of said system and said device includes but is not limited to having plural parts and/or plural layers. Further, in one embodiment, any part or layer of any applied container of said system and said device includes but is not limited to being constructed as a unified one part. In one embodiment, as shown in FIG. 1A and FIG. 1B, the enclosure 2007 is hermetically jointed by the medium-circulation guide 2037 at the joining site 2063. In one embodiment, as shown in FIG. 1A and FIG. 1B, the enclosure 2006 consists of two parts, namely the body 2006*a* of the enclosure and the lid 2006*b* of the enclosure. In one embodiment, the considerations such as having the inner layers protruding from the outer layers to seal the spaces inside the outer layers, like a neck portion as depicted in FIG. 2B, are also disclosed. The maximal filling line 2062 is marked on the outside of said neck portion of said "medium-circulation guide" 2037 to indicate that the maximal filling level of a heating and/cooling medium such as diathermic oil 2056 in the space 10, so that the inner space that is the space 8 is dry and oil free while being accessible from the outside through said access 2037*b*, 2006*b* and 2655.

In some embodiments, said supporting means include but are not limited to supporting braces 43, 2043 and 2052 for said "the second layer" 2007 and/or "the outer layer" 2006. Said supporting braces include but are not limited to the requirements on having weight-bearing capabilities, being easy to be transported with the whole system, and being a thermal-insulation barrier between said "the second layer" 2007 and the ground/the base on the ground. The choices include but are not limited to materials such as woods, metal, plastics, and bricks. In one embodiment, the supporting brace 43 of "the second layer" 2007 is connected to the bottom of "the second layer" 2007, sticking out of "the outer layer" 2006, and standing on the brick-made base. There are separate supporting braces for "the outer layer", which also stand on the brick-made base. In one embodiment, the supporting brace 43 is connected to the bottom of "the second layer" 2007 and stands on the bottom of "the outer layer" 2006 inside "the outer layer" 2006 while "the outer layer" 2006 is placed on the ground and supports and accommodates "the second layer" 2007 inside "the outer layer" 2006. In one embodiment, the space 10 is continuous underneath "the second layer" 2007. The supporting braces of said containers are designed either to not block the medium circulations or to block the medium circulations, for example, having holes to allow medium pass through. In one embodiment, as shown in FIG. 1A and FIG. 1B, the supporting brace 2043 is underneath "the second layer" 2007, and the supporting brace 2052 is underneath said "medium-circulation guide" 2037.

In further embodiments, according to the system above, wherein said devices, said system and said methodologies further include as optional, but are not limited to the following components:

One or a plurality of medium-circulation-generation means including but not limited to the presentations that are depicted in this disclosure. Depending on the desired levels of pressures and also with the considerations of energy consumption etc., different medium-circulation-generation means may be applied. In one embodiment, said medium-circulation-generation means include but are not limited to vacuum pumps, centrifugal fans, axial fans, pump, air compressor, supplied-gas tanks and waste-collecting tanks with pumps. In one embodiment, said medium-circulation-generation means include but are not limited to a vacuum system consisting of vacuum pumps, an inlet filtration system of vacuum pumps, an exhaust filtration system of vacuum pumps, main pipes and branch pipes, and supplied-gas tanks and its distribution system with pipes and outlets. In one embodiment, said supplied-gas tanks are integrated with pumps of its distribution system. In one embodiment, said supplied-gas tanks and said pumps of its distribution system are independent parts. In one embodiment, said supplied gas includes but is not limited to nitrogen. The locations of medium-circulation-generation means include but are not limited to the locations that are mentioned as examples in this disclosure. In one embodiment, said system and said device have medium-circulation-generation means and/or medium-circulation-facilitation means that are not mentioned in this disclosure. In one embodiment, a medium that said medium-circulation-generation means circulate includes but is not limited to a medium depicted herein, such as air, nitrogen, and diathermic oil.

One or plural power-supply means such as power sources and electrical cords for said system and said device. In one embodiment, said power-supply resources can be external and from the source separate from said system. In one embodiment, said power-supply resources are from the power source such as batteries that are accommodated inside said system and said device.

One or plural communication means including but not limited to an alarm system, dialog panels, a computation system, and a data communication system etc.

one or a plurality of thermal-regulation means for said system and said device. In one embodiment, as described in the example 1, there is a direct communication between the thermally conditioned medium and the surrounding medium of the objects inside said system and said device, thermal regulations inside said system and said device are provided by the circulating medium that is thermally conditioned. In one embodiment, as shown in the example 2, there is no direct communication between the thermally conditioned medium and the surrounding medium of the objects inside said system and said device, thermal regulations to the surroundings of the objects are generated through the heat-conductive frame of the enclosures of said container that is cooled or heated by the thermally-conditioned medium. In one embodiment, such as in the example 3, said system and said device is modified to accommodate smaller objects taking advantages of using a heating and/or cooling medium, such as diathermic oil for thermal regulations, in which case otherwise air conditioning would become cumbersome due to small sizes of the containments.

One or a plurality of medium-circulation-facilitation means of facilitating medium circulations. Said medium-circulation facilitation means include but are not limited to the presentations that are mentioned in this disclosure. In one embodiment, the inlets, and outlets of said medium-circulation-generation means include but are not limited to being on the faces of said system and said device. In one embodiment, there are fans placed inside said system and said device. The locations of medium-circulation-facilitation means include but are not limited to the locations that are mentioned as examples in this disclosure. In one embodiment, the functions of medium-circulation-facilitation means include but are not limited to facilitating medium circulations.

In one embodiment, medium-circulation guide 2037 of said medium-circulation-facilitation means also provide padding function to the objects before the metal walls of the second layer 2007. Said medium-circulation guide 2037 of said medium-circulation-facilitation means is not limited to having any suitable degree of hardness, any suitable degree of flexibility, any suitable shape, any suitable geometric resemblance, any suitable size, any suitable color, any suitable materials with any suitable treatments, any suitable textures, and any suitable thickness, within reasonable considerations. In one embodiment, said medium-circulation guides 2037 are closed structure. In one embodiment, said medium-circulation guides 2037 are not an enclosure. In one embodiment, not shown in the figures, said medium-circulation-facilitation means are dome-shaped that cover said walls of a dome-shaped "the second layer" 2007 from the outside of "the second layer" 2007 and guide the heating and/or cooling medium move along the surface of "the second layer" 2007. In one embodiment, said medium-circulation guides may not have holes. In one embodiment, said medium-circulation guides 2037 may have holes. The orifice of said medium-circulation guides 2037 is not limited to having any suitable shape, any suitable geometric resemblance, any suitable size, any suitable color, any suitable thickness, any suitable materials with any suitable treatments, any suitable textures, and any suitable patterns. any suitable color, any suitable thickness, any suitable materials with any suitable treatments, any suitable textures, and any suitable patterns. In one embodiment, the orifice of said medium-circulation guides 2037 is not limited to having filters. In one embodiment, the orifice of said medium-circulation guides 2037 are not limited to have any type of filters, within reasonable considerations.

One or a plurality of medium-regulation means including but not limited to vents for regulating pressures in said system and said device. Said medium-regulation means comprise at least venting means for venting the pressure-buildups in said system and said device. Beside said venting means, said medium-regulation means also include but are not limited to the means: i) sealing the inflow and/or outflow of the contents in said enclosures of said system and said device, ii) maintaining the pressures in said system and said device. In another embodiment, said medium-regulation means such as vents 2005 further comprise location means for setting said medium-regulation means on said system and said device. Said location means of said medium-regulation means include but are not limited to the following embodiments: in one embodiment, the vents 2005 of said system and said device are clustered on the portion of said system and said device in the direction that it is free to expand so that the expansion of said system and said device are guided to the pre-set directions, for example, such as toward the directions where there are no critical structures in the vicinity of said system and said device; in one embodiment, said medium-regulation means such as vents 2005 vent to the directions of 360 degrees within the safety considerations that the venting and the sudden expansions of said system and said device that caused by venting at all directions won't raise safety concerns. In one embodiment, some, or any of the layers of said system and said device have vents. In yet another example, said medium-regulation means such as the air vents 2005 include but are not limited to having various filters. In one embodiment, some of said medium-regulation means such as said vents 2005 have filters. In one embodiment, said medium-regulation means are responsive to the changes of environments, such as reduced atmosphere pressures or pressurized conditions.

One or plural padding means for providing padding for the object from the outside of the object and/or providing padding for any components of said system and said device from either the outside or inside or both sides of the components. In one embodiment, the purposes to have padding means include but are not limited to facilitating the transportation of said system and said device. Said padding means are not limited to the described herein in terms of suitable degree of hardness, suitable degree of flexibility, suitable shape, suitable geometric resemblance, suitable size, suitable color, suitable materials with suitable treatments, suitable textures, and suitable thickness. In one embodiment, said padding means are closed structure. In one embodiment, said padding means are not an enclosure. In one embodiment, said padding means have zero, or a single or plural orifices.

One or plural systems monitoring the pressures with the barometric sensors and/or being regulated by the central controller.

One or plural systems monitoring the temperatures with thermal sensors and/or being regulated by the central controller.

One or plural systems monitoring the oxygen concentrations with the oxygen sensors and/or regulating the oxygen concentrations by the central controller.

One or plural systems monitoring smoke with the smoke detectors and the system feeding and/or regulating smoke levels by the central controller.

One or plural systems of sensors that are not limited to the system to monitor pressures, the system to monitor temperatures, the system to monitor the oxygen concentrations, and the system to monitor smokes. Said systems of said detections include but are not limited to any suitable type. In one embodiment, the numbers of sensors include but are not limited to the numbers depicted herein. In one embodiment, the device of invention has the special sensors for sensing the unwanted gas. In one embodiment, the locations of the sensors include but are not limited to the locations depicted herein. In one embodiment, said system and said sensors include but are not limited to operating under the normal conditions such as normal atmosphere; in one embodiment, some specific sensors work under the relative vacuumed conditions or pressurized conditions.

One or plural access means to the interior of the spaces formed by said system and said device, including but not limited to doors, and/or an access for medium-circulation-generation means, and/or power-supply means, and/or communication means, and/or thermal-regulation means, and/or medium-circulation-facilitation means, and/or medium-regulation means, and/or padding means, and/or fire-suppressing means. In one embodiment, there are doors to access the spaces between enclosures of said containers, such as "the second layer" 2007 and "the outer layer" 2006.

One or plural dividers to separate any space that is formed by any of applied said container into separate compartments.

One or plural fire-suppressing means for providing fire-suppressing and fire-preventing functions including but not limited to any of the mechanisms as follow. In one embodiment, the protected object such as the batteries or the data storage is encased in the airtight enclosure of "the second layer" 2007 with a suitable level of hypoxic percentages of oxygen. In one embodiment, the spaces inside "the second layer" 2007 and "the outer layer" 2006 are pressurized or purged with clean air or with noninflammable gas. Additional apparatus and considerations are applied according to the fire safety regulations, such as a national fire protection association standard (NFPA 496) that outlines the requirements for purged and pressurized enclosures for electrical equipment. In one embodiment, for the applications requiring life sustaining conditions, additional considerations of life sustaining conditions have to be considered and applied. In one embodiment, depending on the applied settings such as the types of said medium and the pressure levels inside "the second layer" 2007 and "the outer layer" 2006, there may be requirements on wearing life-sustaining suits to enter vacuum conditions and/or nitrogen filled environments of the data storage units. In some embodiments, the injection of nonflammable gases in "the second layer" 2007, when necessary, provides additional capability of quenching fire hazards. In one embodiment, fire hazards are suppressed by the airtight enclosure of "the outer layer" 2006 as the additional steps to contain the fire hazards. In one embodiment, the vacuum conditions in the air-tight enclosure provide further prevention and suppression of fire hazards. In one embodiment, nonflammable materials such as silicone gels or noninflammable foam or noninflammable solid or noninflammable liquid, that surround the objects such as batteries, also provide functions of quenching fire hazards. In one embodiment, the following methods of fire suppression and fire prevention are also applied in said system and said device: injecting fire-suppressing gases, and/or sprinkling water, and/or spraying foams or mixtures of fire suppression and fire prevention, in any location of said system and said device. In one embodiment, the generations of the agents of fire suppression and fire prevention, such as generating the noninflammable gas, or foams, or gels, or mixtures, include but are not limited to any suitable methods, such as using prefilled gas tanks, or applying azide-based propellant grains to generate fire-suppressing gas upon ignition, or mixing the appropriate reagents to generate fire-suppressing gas, or foams or gels or mixtures, any other unmentioned suitable forms and materials that meet the regulations of fire extinguisher, such as USA EPA requirements regarding ozone safe alternatives. In some embodiments, said fire-suppressing means provide insulation and containments to the objects in danger of hazards such as fire hazards and water damages, whether the hazards are from the outside of said system and said device or from the objects that are inside of said device and system.

One or plural integrated systems for coordinating all or some components of said system and said device. In one embodiment, said integrated system is the central controller.

One or plural bases for said system and said device. In one embodiment, said base provides additional thermal insulation between said system and said device, and the ground. In one embodiment, the base that is made of thermal-insulation bricks provides additional thermal insulation to the bottom of the brace 43 that is made of metal. Said base includes but is not limited to what is depicted herein, in terms of size, thickness, shape, materials and functions etc. In one embodiment, said supporting means such as said braces have in-ground portions that are through said base.

One or plural parts or layers that are expendable to increase the contained space inside the enclosure when filled. In one embodiment, as shown as the layer 2006c in FIG. 1A and FIG. 1B, said embodiments also disclose hazard containments that are not only for containing a liquid medium that is used for thermal regulations in the events of leakage, but also for hazard containments in the events such as the thermal runaway of the batteries.

The numbers, locations, and types of said components include but are not limited to what is depicted in this disclosure.

In another embodiment, said system and said device include but are not limited to being transportable from one site to another. In one embodiment, the materials that are used to build said system and said device are selected with the considerations including but not limited to being relatively light weight for easy transportation, such as using weather treated woods for said braces of said containers, within safety considerations. In one embodiment, the materials that are used to build said system and said device are selected with the considerations including but not limited to prioritizing being cost effective, such as selecting coated fire-retardant plastics to fit the purpose for building some components of said system and said device, within safety considerations.

Further still, wherein even though said system and said device are intended to be the outmost layers of the objects or applications, said system and said device are not limited to any specific locations to the reference of the objects or applications. In one embodiment, multiple said system and said device are stacked. In one embodiment, said system and said device are within the objects where said system and said device are not the outmost layers. In one embodiment, said system and said device include but are not limited to the compartments, components, layers, the spaces, and the frames which are depicted herein. In one embodiment, more compartments, components, layers, the spaces, the frames and/or the components that are not depicted herein could be added or omitted. In one embodiment, the components of said system and said device include but are not limited to functioning altogether. In one embodiment, at least some components of said system and said device function independently when other components are not in use. In one embodiment, said spaces that are formed by said faces or enclosures of said containers include but are not limited to having the components that are depicted herein. The components that are depicted in the examples include but are not limited to being arranged as depicted herein.

It should be understood that said system and said device are not limited to the specific applications, functions, materials, textures, shapes, sizes, patterns, colors, ranges of temperatures, ranges of pressures and any ranges of vacuum conditions that are depicted herein. In one embodiment, the distances between each component of said system and said device include but are not limited to what is depicted herein; the sizes of each compartment include but are not limited to what is depicted herein. In one embodiment, said system and said device are to be customized to accommodate applications. In one embodiment, the technologies that are applied in said system and said device, such as the pump types, detection mechanism etc. are not limited to the technologies or the processes that are depicted herein.

In one embodiment, said system and said device and said methodology could be customized and applied on diverse applications that need to be in a relative vacuum condition and/or that need to be in the air-tight environments that are filled with supplied gas with regulated ventilations, and/or that require regulating the temperatures to adapt in cold and/or hot environments, and/or that need certain measures of insulation and containment. The applications include but are not limited to such as constructing data centers or constructing the extra outer layers for the special buildings of said conditions herein. In one embodiment, said system and said device and said methodology could be customized and applied on the applications of the extra outer layers of personal insulation, with modifications to be suitable to assist sustaining life. For the applications on personal insulation such as personal tents, or the space buildings or other life-sustaining buildings, special considerations of life sustaining conditions have to be considered and applied, comparing with the settings for the non-life objects.

Some embodiments in this disclosure also intend to cover at least a feature of one embodiment in separate configurations or in combinations, whether the feature of one embodiment is combined with any other embodiments that are presented in this disclosure or is not combined with any embodiment that is presented in this disclosure, with reasonable considerations.

While several variations of some embodiments have been illustrated and described in this filing by way of example in particular embodiments, it is apparent that further embodiments could be developed within the spirit and scope of the present invention. However, it is to be expressly understood that such modifications and adaptations are within the spirit and scope of the present invention, and are inclusive, but not limited to the following appended claims as set forth.

What is claimed is:

1. An enclosure system comprising:
   an interior container layer having a plurality of holes for medium circulation and defining an interior space therein;
   an intermediate container layer attached to the interior container layer such that the
   interior container layer is located within the intermediate container layer, the intermediate container layer having a plurality of heat transfer fins located thereon at
   interior and exterior surfaces to facilitate heat transfer through the intermediate container layer; and
   an exterior container layer attached to the interior container layer such that the interior and intermediate container layers are located within the exterior container layer;
   wherein an intermediate space is defined between the intermediate container layer and the interior container layer, and an exterior space is defined between the exterior
   container layer and the intermediate container layer;
   wherein the intermediate container layer is hermetically sealed to the interior container layer such that a medium may travel between the interior space and the intermediate space via the plurality of holes, and such that fluid leakage between the exterior space and the intermediate space is prevented.

2. The enclosure system of claim 1 comprises medium-circulation-generation means further comprising one or a plurality of fans, blowers, air compressors, vacuum pumps, pumps for circulating a medium inside any of one or more applied said containers, and combinations thereof, and/or inside any said layer of space that is created by said construction means.

3. The enclosure system of claim 1 wherein said medium includes but is not limited to air, nitrogen and diathermic oil.

4. The enclosure system of claim 1 wherein said system and said device further includes one or a plurality of medium-circulation-facilitation means that is other than guided and/or detoured distribution paths of a medium, such medium-circulation-facilitation means comprising:

i) strategically placed inlets and/or outlets for facilitating circulating a medium inside any of a single or plural numbers of applied said container, and/or any said layer of space;
   ii) and/or a "the medium-circulation guide" for guiding the flow of a medium inside any of a single or plural numbers of applied said container, and/or any said layer of space;
   iii) and/or a fan for facilitating medium circulations inside any of single or plural numbers of applied said container, and/or any said layer of space.

5. The enclosure system of claim 4 wherein a panel of said medium-circulation guide is placed adjacent to a wall of said container in a spaced relation with the wall of said container, to guide air flow along the wall.

6. The enclosure system of claim 1 wherein a said interior container is a closed structure with holes allowing a portion of a medium to flow therethrough, while the rest of said medium is guided to flow along the space created by said medium-circulation guide.

7. The enclosure system of claim 1 wherein said container further comprises a part or a layer that is expendable to increase the contained space inside the enclosure when filled.

8. The enclosure system of claim 1 comprises a vent venting the contents of the interior of said system and said device into one or a plurality of layers of the spaces that are created by a said interior container, a said intermediate container, and/or a said exterior container, such as a space created by a said expendable portion of said system and said device, which can further be drained by the vents, such as the vents on said expendable portion of said system and said device.

9. The enclosure system of claim 1 wherein said container has one or a plurality of parts and/or layers, including but not limited to a lid portion.

10. The enclosure system of claim 1 comprises construction means further comprising an access to the interior of said container, whereby said system and said device allows an access to the interior of said container, while also allowing said medium circulating along the outside of said container without a communication between some of said medium circulations and said interior.

11. The enclosure system of claim 1 wherein a said interior container partially sticks out of a said container such as a said intermediate container by having a neck portion, said neck portion being enclosed by another said container such as a said intermediate container, a said interior container being joined by both said intermediate container and said exterior container in a spaced relation with both said containers, to create at least two closed spaces accommodating medium-circulations respectively.

12. The enclosure system of claim 11 wherein the opening of said neck portion of a said container is above with a height a said medium-circulation which is outside of a said interior container and/or a said intermediate container, whereby said medium-circulation outside of a said interior container and/or a said intermediate container is kept separate from the medium-circulation inside a said interior container and/or a said intermediate container.

13. The enclosure system of claim 1 comprises supporting means further comprising a path for a medium to go through whereby said system and said device allows said medium circulating through a path in the area underneath the supported said container such as a said interior container and/or a said intermediate container and/or a said exterior container.

14. The enclosure system of claim 1 wherein said system and said device comprise a layer that is made of, or is coated with, fire resistance materials.

15. The enclosure system of claim 1 wherein said system and said device comprise a layer that is made of, or is coated with materials of thermal insulation.

16. The enclosure system of claim 1 wherein said system and said device comprise a layer that has a frame.

17. The enclosure system of claim 1 wherein said system and said device comprises a combination of a material of heat conductivity and medium-circulation means whereby said system and said device utilizes heat-conductivity of a wall of said containers together with said medium-circulation-generation means in thermal regulations of said containers.

18. The enclosure system of claim 1 wherein said system and said device further comprise one or a plurality of vents for regulating pressure within said system and said device, operable at normal atmosphere pressures and/or reduced atmosphere pressures and/or pressurized conditions.

19. The enclosure system of claim 18 wherein said vents further comprise a function of venting when the pressure inside said system and said device reaches the set thresholds that are more than the normal operations of said vents and said medium-circulation-generation means could handle.

20. The enclosure system of claim 18 wherein said vents further comprise a filter.

21. The enclosure system of claim 18 wherein some of said vents of said system and said device comprise a location, including but not limited to being enclosed by the expansion part of said system and said device, whereby a said expendable part may or may not expand to all the directions but may only expand to a direction.

22. The enclosure system of claim 1, wherein said system and said device include but are not limited to being transportable from one site to another.

23. The enclosure system of claim 1 wherein said system further comprise sensors.

24. The enclosure system of claim 1 further comprises one or plural dividers to separate a space that is formed by said container into separate compartments.

25. The enclosure system of claim 1 further comprises one or plural padding means for providing padding for objects that are accommodated in said system and said device from being the outside of the objects and/or providing padding for any components of said system and said device.

26. The enclosure system of claim 1 further comprises one or plural power-supply means.

27. The enclosure system of claim 1 further comprises one or plural communication means including but not limited to one of an alarm system, dialog panels, a computation system, and/or a data communication system.

28. The enclosure system of claim 1 further comprises one or plural fire-suppressing means for providing fire-suppressing and fire-preventing functions, said fire-suppressing means including but not limited to premade or generated-upon-ignition fire-suppressing mixtures inside said container, injecting fire-suppressing gases, and/or filling fire-suppressing gels inside said container.

29. The enclosure system of claim 1 further comprise one or a plurality of bases for said container to provide additional thermal insulation between said container, and the ground.

* * * * *